United States Patent
Westhoff et al.

(10) Patent No.: US 9,206,330 B2
(45) Date of Patent: Dec. 8, 2015

(54) ZINC-IMIDAZOLE-CARBOXYLATE-COMPLEX-CATALYSED COATING AGENT COMPOSITION

(75) Inventors: Elke Westhoff, Steinfurt (DE); Peter Hoffmann, Senden (DE); Bernadette Möller, Maria-Veen (DE); Benedikt Schnier, Warendorf (DE)

(73) Assignee: BASF Coatings GmbH, Munster (DE)

( * ) Notice: Subject to any disclaimer, the term of this patent is extended or adjusted under 35 U.S.C. 154(b) by 173 days.

(21) Appl. No.: 14/006,024

(22) PCT Filed: Mar. 15, 2012

(86) PCT No.: PCT/EP2012/054546
§ 371 (c)(1),
(2), (4) Date: Nov. 27, 2013

(87) PCT Pub. No.: WO2012/126796
PCT Pub. Date: Sep. 27, 2012

(65) Prior Publication Data
US 2014/0162074 A1    Jun. 12, 2014

Related U.S. Application Data

(60) Provisional application No. 61/453,986, filed on Mar. 18, 2011.

(30) Foreign Application Priority Data

Mar. 18, 2011  (EP) .................................... 11158846

(51) Int. Cl.
| | | |
|---|---|---|
| C09D 175/04 | (2006.01) |
| B05D 7/00 | (2006.01) |
| C08G 18/16 | (2006.01) |
| C08G 18/20 | (2006.01) |
| C08G 18/22 | (2006.01) |
| C08G 18/62 | (2006.01) |
| C08G 18/79 | (2006.01) |

(52) U.S. Cl.
CPC .............. *C09D 175/04* (2013.01); *B05D 7/534* (2013.01); *B05D 7/544* (2013.01); *C08G 18/165* (2013.01); *C08G 18/168* (2013.01); *C08G 18/2027* (2013.01); *C08G 18/222* (2013.01); *C08G 18/6225* (2013.01); *C08G 18/792* (2013.01); *Y10T 428/31551* (2015.04)

(58) Field of Classification Search
CPC ....... C09D 175/04; B05D 7/544; B05D 7/534
USPC .............. 428/423.1; 524/507, 558; 427/407.1
See application file for complete search history.

(56) References Cited

U.S. PATENT DOCUMENTS

| | | |
|---|---|---|
| 4,006,124 A | 2/1977 | Welte et al. |
| 4,939,213 A | 7/1990 | Jacobs, III et al. |
| 5,084,541 A | 1/1992 | Jacobs, III et al. |
| 5,716,678 A | 2/1998 | Rockrath et al. |
| 2005/0182189 A1 | 8/2005 | Ohrbom et al. |
| 2006/0036007 A1 | 2/2006 | Hsieh et al. |
| 2006/0247341 A1 | 11/2006 | Hsieh et al. |
| 2009/0011124 A1 | 1/2009 | Hsieh et al. |
| 2010/0279005 A1* | 11/2010 | Vaes et al. ..................... 427/140 |

FOREIGN PATENT DOCUMENTS

| | | |
|---|---|---|
| EP | 0008127 A1 | 2/1980 |
| EP | 0249201 A2 | 2/1987 |
| EP | 0276501 A2 | 8/1988 |
| EP | 0624577 A1 | 11/1994 |
| EP | 0692007 B1 | 1/1996 |
| EP | 0882748 A2 | 12/1998 |
| EP | 0994117 A1 | 4/2000 |
| EP | 1273640 A2 | 1/2003 |
| EP | 1460094 A1 | 9/2004 |
| WO | WO9422968 A1 | 10/1994 |
| WO | WO9712945 A1 | 4/1997 |
| WO | WO0109260 A1 | 2/2001 |
| WO | WO2004029121 A1 | 4/2004 |
| WO | WO2009135600 A1 | 11/2009 |

OTHER PUBLICATIONS

International Preliminary Report on Patentability for International Application No. PCT/EP2012/054546 issued Sep. 24, 2013, 9 pages.
English Translation of International Preliminary Report on Patentability for International Application No. PCT/EP2012/054546 issued Sep. 24, 2013, 12 pages.
Werner J. Blank, Z.A. He, and Ed. T. Hessell, "Catalysis of the Isocyanate-Hydroxyl Reaction by Non-Tin Catalysts", King Industries Inc., Norwalk, CT, www.wernerblank.com, 15 pages.
Rompp Lexikon "Lacke and Druckfarben," Georg Thieme Verlag, Stuttgart, 1998, pp. 250 to 252, 5 pages.
International Search Report for International Application No. PCT/EP2012/054546 mailed Jun. 29, 2012, 4 pages.
English Translation of International Search Report for International Application No. PCT/EP2012/054546 mailed Jun. 29, 2012, 3 pages.
Written Opinion for International Application No. PCT/EP2012/054546 mailed Jun. 29, 2012, 8 pages.
English Translation of Written Opinion for International Application No. PCT/EP2012/054546 mailed Jun. 29, 2012, 11 pages.
Non-Final Office Action in U.S. Appl. No. 14/372,614, dated Jun. 8, 2015, 12 pages.

* cited by examiner

*Primary Examiner* — Thao T Tran
(74) *Attorney, Agent, or Firm* — Servilla Whitney LLC

(57) ABSTRACT

The invention relates to coating material compositions comprising an isocyanate group-containing component, a hydroxyl group-containing component, a zinc-imidazole-carboxylate complex and a monomeric aromatic carboxylic acid, and also to the use of a zinc-imidazole-carboxylate complex in the presence of a monomeric aromatic carboxylic acid as a catalyst system for the urethane reaction in coating material compositions.

15 Claims, No Drawings

ZINC-IMIDAZOLE-CARBOXYLATE-COMPLEX-CATALYSED COATING AGENT COMPOSITION

CROSS REFERENCE TO RELATED APPLICATIONS

This application is a National Phase Application of Patent Application PCT/EP2012/054546 filed on 15 Mar. 2012, which claims priority to EP 11158846.3 filed 18 Mar. 2011 and U.S. 61/453,986 filed 18 Mar. 2011, of which all aforementioned applications are incorporated by reference herein in their entirety.

FIELD OF THE INVENTION

The invention relates to coating material compositions comprising an isocyanate group-containing component, a hydroxyl group-containing component, and a zinc-imidazole-carboxylate complex, and also to the use of a zinc-imidazole-carboxylate complex as a catalyst system for the urethane reaction in coating material compositions.

BACKGROUND OF THE INVENTION

Two component polyurethane systems find broad application as paints, foams, fibers, and nonporous moldings. Where the crosslinking partners are reactive even at room temperature, the polymer is obtained by mixing and subsequently reacting an isocyanate group-containing component with a hydroxyl group-containing component. The reaction here of the isocyanate group with the hydroxyl group is frequently catalyzed with addition of basic compounds, such as tertiary amines or compounds containing amidine groups. Examples of such compounds are 1,4-diazabicyclo[2.2.2]octane or 1,8-diazabicyclo[5.4.0]undec-7-ene (DBU). A markedly higher catalytic activity, however, is possessed by organometallic compounds, such as dibutyltin dilaurate or various zinc carboxylates. The amount of catalyst used is determined on the one hand so as to ensure a sufficiently long processing life for the area of application, and on the other hand so as to attain, as early as possible following application, a profile of properties that is sufficient for subsequent operations. For automotive refinish in particular it is important to attain a rapid assembly strength.

The tin-based catalysts well-known from the prior art, such as dibutyltin dilaurate, dioctyltin dilaurate, dibutyltin diacetate, dibutyltin maleate or tetrabutylstannoxane diacetate, are effective catalysts for the formation of the urethane bond, but these compounds are toxic. On account of the toxicity of many tin compounds, attempts have been made for a long time already to find substitute catalysts suitable for coating material compositions.

Accordingly, the article "Catalysis of the Isocyanate-Hydroxyl Reaction by Non-Tin Catalysts" by Werner J. Blank, Z. A. He, and Ed. T. Hessell from King Industries Inc., describes alternatives to the conventional tin-containing catalysts, on the basis of various metal salts and metal complexes, such as zirconium chelates, aluminum chelate, and bismuth carboxylate.

WO 2009/135600 describes catalysts based on N-heterocyclic carbenes for the synthesis of polyurethanes. EP 1 460 094 describes catalysts based on metal salts in conjunction with bicyclic tertiary amine compounds and a quaternary ammonium salt. U.S. Pat. No. 4,006,124 describes general amidine-metal complexes as catalysts for the isocyanate polyaddition reaction. WO 2004/029121 discloses the use of acids having a $pK_a$ of between 2.8 and 4.5 as catalysts for the urethane reaction. A failing common to all these catalysts is that they result either in excessively slow curing of the coating system or else in a curtailed working time (pot life). Moreover, a number of the catalysts identified above cause discoloration of the coating materials or a subsequent yellowing of the applied coatings. Compounds of this kind are unsuitable for high-grade clearcoat systems. In addition, the publications identified above also describe cadmium and lead-containing catalysts, which on account of their toxicity are also out of contention as alternatives to tin-based catalysts. The bismuth- or zirconium-based catalysts described in the publications identified above are sensitive to hydrolysis and ought therefore only to be diluted in the curing agent. On account of the sensitivity to hydrolysis, coating systems based on bismuth and zirconium catalysts, moreover, possess a short shelf life.

As already described above, amines may also have a catalyzing activity on the polyurethane reaction. Nevertheless, their pot life is insufficient for processing in the automotive refinish segment. On account of the high vapor pressure of amines of low molecular mass, the only amines, if any, that are contemplated for this application are those such as diazabicycloundecene (DBU) or diazabicyclononene (DBN). Use of these amines, though, leads to strongly colored mixtures, and the resultant catalyzed coating systems have a propensity to unacceptable yellowing.

US 2006/0036007 discloses organometallic complexes as catalysts for the crosslinking of polyurethane-based systems. Described therein in particular are amidine compounds of zinc for the catalysis of the reaction of hydroxyl group-containing components with isocyanate group-containing components. These catalysts are said to be adsorbed on fumed silica. In US 2006/0247341 and US 2009/0011124, amidine-zinc complexes are likewise used as catalysts in 2-component polyurethane coating systems. These catalysts are said to be particularly stable to hydrolysis and to be suitable also for use in aqueous systems. Nevertheless, the catalyst systems disclosed in these three documents do not exhibit sufficient curing properties. A comparison of the reactivity of these systems with tin-catalyzed systems shows that these zinc-amidine-based catalysts have poorer curing properties for a given processing life.

The object on which the invention is based is that of providing coating systems with suitable catalysts which exhibit not only rapid curing of the system but also a long processing life. Moreover, the coating systems are to confer on the user the possibility of rapid further-processing of the surfaces/articles coated with the systems. These systems, furthermore, are not to exhibit any changes in color before or after curing. In the area of clearcoats in the automobile industry, in particular, the requirements imposed on the inherent color of the systems are exacting. Thus the catalyst must not have an inherent color, and nor must it, together with the customary coating components, lead to any discoloration when the coating material is mixed or cured. The catalyst, moreover, ought to be able to be added to the coating system from the outset. Admixing the catalyst to the coating systems from the start, however, is not to have any adverse effect on the shelf life of the coating composition. Additionally, the catalyst ought to be insensitive to hydrolysis, since, even in systems in organic solution, the typically high concentration of hydroxyl groups can lead to a reduction in catalyst activity over the storage life. In the automotive refinish segment especially, an extremely long shelf life even at relatively high temperatures is an advantage.

SUMMARY OF THE INVENTION

Surprisingly it has been found that the object of the invention is achieved by means of a coating material composition which comprises
- at least one polyhydroxyl group-containing component (A),
- at least one polyisocyanate group-containing component (B),
- at least one zinc-imidazole-carboxylate complex (D) preparable by reacting at least one Zn(II) biscarboxylate with one or more imidazoles of the general formula (I)

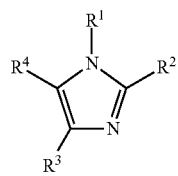

in which
$R^1$ is an acyclic or cyclic, saturated or unsaturated hydrocarbon radical, an aromatic hydrocarbon radical or a radical $R^v$-aryl, where $R^v$ is an alkylene radical and aryl is an aromatic radical,
$R^2$, $R^3$ and $R^4$ independently of one another are hydrogen, an acyclic or cyclic, saturated or unsaturated hydrocarbon radical, an aromatic hydrocarbon radical or a radical $R^v$-aryl, where $R^v$ is an alkylene radical and aryl is an aromatic radical,
with the proviso that
zinc-(1-methylimidazole)-bis(2-ethylhexanoate) complexes (D) which are obtainable by reacting zinc(II) bis(2-ethylhexanoate) with 1-methylimidazole in a molar ratio of 1 to 2.2 are excluded, and
at least one monomeric aromatic carboxylic acid (S), in which the carboxyl group is in conjugation to a pi electron system.

As a result of the use of a catalyst system comprising at least one zinc-imidazole-carboxylate complex (D) as defined above and at least one monomeric aromatic carboxylic acid (S) in which the carboxyl group is in conjugation to a pi electron system, in coating materials featuring at least one polyisocyanate group-containing component and at least one polyhydroxyl group-containing component, the corresponding coating systems display excellent curing properties, early capacity for operations, and an extended processing life, and, furthermore, these catalyst systems are insensitive to hydrolysis and do not cause any discoloration or yellowing of the coating system.

DESCRIPTION OF AN EMBODIMENT OF THE INVENTION

The present invention relates to coating material compositions comprising
- at least one polyhydroxyl group-containing component (A),
- at least one polyisocyanate group-containing component (B),
- at least one zinc-imidazole-carboxylate complex (D) preparable by reacting at least one Zn(II) biscarboxylate with one or more imidazoles of the general formula (I)

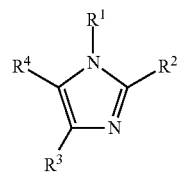

in which
$R^1$ is an acyclic or cyclic, saturated or unsaturated hydrocarbon radical, an aromatic hydrocarbon radical or a radical $R^v$-aryl, where $R^v$ is an alkylene radical and aryl is an aromatic radical,
$R^2$, $R^3$ and $R^4$ independently of one another are hydrogen, an acyclic or cyclic, saturated or unsaturated hydrocarbon radical, an aromatic hydrocarbon radical or a radical $R^v$-aryl, where $R^v$ is an alkylene radical and aryl is an aromatic radical,
with the proviso that
zinc-(1-methylimidazole)-bis(2-ethylhexanoate) complexes (D) which are obtainable by reacting zinc(II) bis(2-ethylhexanoate) with 1-methylimidazole in a molar ratio of 1 to ≤2.2 are excluded, and
at least one monomeric aromatic carboxylic acid (S), in which the carboxyl group is in conjugation to a pi electron system.

As the at least one polyhydroxyl group-containing component (A) it is possible to use all compounds known to the skilled person that have at least two hydroxyl groups per molecule and are oligomeric and/or polymeric.

The preferred oligomeric and/or polymeric polyols (A) have mass-average molecular weights Mw>500 daltons, measured by means of gel permeation chromatography (GPC) against a polystyrene standard, preferably between 800 and 100 000 daltons, more particularly between 1000 and 50 000 daltons.

Particular preference is given to polyester polyols, polyurethane polyols, polysiloxane polyols, polyacrylate polyols and/or polymethacrylate polyols, and also their copolymers.

The polyols preferably have an OH number of 30 to 400 mg KOH/g, more particularly between 100 and 300 mg KOH/g. The hydroxyl number (OH number) indicates the number of mg of potassium hydroxide that are equivalent to the amount of acetic acid bound by 1 g of substance on acetylation.

The glass transition temperatures, measured by means of DSC measurements in accordance with DIN-EN-ISO 11357-2, of the polyols are preferably between −150 and 100° C., more preferably between −120° C. and 80° C.

Suitable polyester polyols are described in, for example, EP-A-0 994 117 and EP-A-1 273 640. Polyurethane polyols are prepared preferably by reaction of polyester polyol prepolymers with suitable di- or polyisocyanates, and are described in EP-A-1 273 640, for example. Suitable polysiloxane polyols are described in, for example, WO-A-01/09260, and the polysiloxane polyols cited therein may be employed preferably in combination with further polyols, more particularly those having relatively high glass transition temperatures.

The poly(meth)acrylate polyols that are especially preferred in accordance with the invention are generally copolymers and preferably have mass-average molecular weights Mw of between 1000 and 20 000 daltons, more preferably between 1500 and 10 000 daltons, in each case measured by means of gel permeation chromatography (GPC) against a polystyrene standard.

The glass transition temperature of the copolymers is generally between −100 and 100° C., more particularly between −50 and 80° C. (measured by means of DSC measurements in accordance with DIN-EN-ISO 11357-2).

The poly(meth)acrylate polyols preferably have an OH number of 60 to 250 mg KOH/g, more particularly between 70 and 200 KOH/g, and also an acid number of between 0 and 30 mg KOH/g.

Hydroxyl-containing monomer building blocks used are preferably hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, and 3-hydroxybutyl methacrylate, and also, in particular, 4-hydroxybutyl acrylate and/or 4-hydroxybutyl methacrylate.

As further monomer building blocks for the poly(meth)acrylate polyols it is preferred to use alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate.

As further monomer building blocks for the poly(meth)acrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

Preference is given to using poly(meth)acrylate polyols and/or polyester resins, more preferably poly(meth)acrylate polyols, as polyhydroxyl group-containing component (A).

Suitability as the at least one polyisocyanate group-containing component (B) is possessed by conventional substituted or unsubstituted aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-tri-methylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, per-hydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid) and mixtures of the aforementioned polyisocyanates. Preferred polyisocyanates are also the biuret dimers and the isocyanurate trimers of the aforementioned diisocyanates. Particularly preferred polyisocyanates (B) are hexamethylene 1,6-diisocyanate, isophorone diisocyanate, and 4,4'-methylenedicyclohexyl diisocyanate, their biuret dimers and/or their isocyanurate trimers and/or their asymmetric trimers such as, for example, the asymmetric HDI-trimer available commercially under the name Desmodur®XP2410.

Furthermore, however, it is also possible to use the conventional derivatives of the aforementioned organic aliphatic, cycloaliphatic, aromatic or heterocyclic polyisocyanates with carbodiimide, uretonimine, uretdione, allophanate, biuret and/or isocyanurate structure, and also prepolymers obtained by reacting the polyisocyanate with compounds having hydrogens that are reactive toward isocyanate groups.

The polyisocyanate group-containing component (B) may be present in a suitable solvent. Suitable solvents are those which allow sufficient solubility of the polyisocyanate component and are free from groups reactive toward isocyanates. Examples of such solvents are acetone, methyl ethyl ketone, cyclohexanone, methyl isobutyl ketone, methyl isoamyl ketone, diisobutyl ketone, ethyl acetate, n-butyl-acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, butylal, 1,3-dioxolane, glycerol formal, benzene, toluene, n-hexane, cyclohexane, solvent naphtha, 2-methoxypropyl acetate (MPA), and ethyl ethoxypropionate.

Where appropriate, and further to the polyhydroxyl group-containing component (A), the coating materials of the invention may further comprise one or more hydroxyl group-containing compounds (C) that are different from component (A). These compounds (C) preferably account for a fraction of 1% to 20%, more preferably of 1% to 10%, very preferably of 1% to 5%, by weight, based in each case on the binder content of the coating material.

Low Molecular Mass Polyols are used as Hydroxyl Group-Containing Compound (C).

Low molecular mass polyols used are, for example, diols, such as, preferably, ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as, preferably, trimethylolethane, trimethylolpropane, trimethylolhexane, 1,2,4-butanetriol, pentaerythritol, and dipentaerythritol.

The polyhydroxyl group-containing component (A) may be present in a suitable solvent. Suitable solvents are those which allow sufficient solubility of the polyhydroxyl component. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, ethylal, butylal, 1,3-dioxolane, glycerol formal, benzene, toluene, n-hexane, cyclohexane, solvent naphtha, 2-methoxypropyl acetate (MPA), and ethyl ethoxypropionate, and mixtures thereof. Furthermore, the solvents may also carry groups reactive toward isocyanates. Examples of such reactive solvents are those which have an average functionality in terms of groups reactive toward isocyanates of at least 1.8. In this specification, the solvents that are suitable as reactive diluents differ from the polyhydroxyl group-containing component (A) and (C). The solvents that are suitable as reactive diluents are monomers and may be, for example, low molecular mass diamines (e.g., ethylenediamine).

The at least one zinc-imidazole-carboxylate complex (D) as defined above is a complex of zinc(II) with the imidazoles of the general formula (1) and carboxylate as ligands, with zinc-(1-methylimidazole)-bis(2-ethylhexanoate) complexes (D) which are obtainable by reacting zinc(II) bis(2-ethylhexanoate) with 1-methylimidazole in a molar ratio of 1 to ≤2.2 being excluded from the definition.

For the imidazoles of the general formula (I)

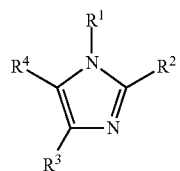
(I)

it is the case, with the proviso of the above general definition, preferably, that $R^1$ is a saturated or unsaturated, straight-chain or branched hydrocarbon radical having up to 20 carbon atoms, a 5- or 6-membered aromatic hydrocarbon radical having up to 10 carbon atoms, or a radical $R^v$-aryl, where $R^v$ is an alkylene radical having 1 to 6 carbon atoms and aryl is a 5- or 6-membered aromatic ring having up to 10 carbon atoms, and where all of the aforementioned radicals may optionally contain heteroatoms such as, for example, oxygen, sulfur or nitrogen, $R^2$, $R^3$ and $R^4$ independently of one another are hydrogen, a saturated or unsaturated, straight-chain or branched hydrocarbon radical having up to 20 carbon atoms, a 5- or 6-membered aromatic hydrocarbon radical having up to 10 carbon atoms, or a radical $R^v$-aryl, where $R^v$ is an alkylene radical having 1 to 6 carbon atoms and aryl is a 5- or 6-membered aromatic ring having up to 10 carbon atoms, and where all of the aforementioned radicals may optionally contain heteroatoms such as, for example, oxygen, sulfur or nitrogen.

With particular preference $R^1$ is a saturated, straight-chain or branched alkyl radical having up to 12 carbon atoms, very preferably up to 6 carbon atoms, a 5- or 6-membered aromatic hydrocarbon radical having up to 6 carbon atoms, very preferably 3 to 6 carbon atoms, or a radical $R^v$-aryl, where $R^v$ is preferably an alkylene radical having 1 or 2 carbon atoms and aryl is a 5- or 6-membered aromatic radical having 3 to 6 carbon atoms, and where all of the aforementioned radicals may optionally contain heteroatoms such as, for example, oxygen, sulfur or nitrogen.

Independently of one another, the radicals $R^2$, $R^3$, and $R^4$ are preferably hydrogen or are a saturated, straight-chain or branched alkyl radical having up to 12 carbon atoms, very preferably up to 6 carbon atoms, a 5- or 6-membered aromatic hydrocarbon radical having up to 10 carbon atoms, very preferably 3 to 6 carbon atoms, or a radical $R^v$-aryl, where $R^v$ is preferably an alkylene radical having 1 or 2 carbon atoms and aryl is a 5- or 6-membered aromatic ring having 3 to 6 carbon atoms, and where all of the aforementioned radicals may optionally contain heteroatoms such as, for example, oxygen, sulfur or nitrogen. With very particular preference the radials $R^3$ and $R^4$ are hydrogen.

Generally it is the case that imidazoles monosubstituted in position 1 ($R^2=R^3=R^4=H$) and imidazoles disubstituted in positions 1 and 2 ($R^2≠H$, $R^3=R^4=H$) are preferred.

Among the imidazoles monosubstituted in position 1, very particular preference is given to 1-alkylimidazoles ($R^1$=alkyl, $R^2=R^3=R^4=H$), in which the alkyl radical has preferably 1 to 6 carbon atoms (as for example methyl, ethyl, n-propyl, iso-propyl, n-butyl, iso-butyl, tert-butyl, pentyl, hexyl), 1-arylimidazoles ($R^1$=aryl, $R^2=R^3=R^4=H$), in which the aryl radical is a 5- or 6-membered aromatic radical having 3 to 6 carbon atoms, as for example a phenyl radical, or 1-aralkylimidazoles ($R^1$=aralkyl=$R^v$-Aryl, $R^2=R^3=R^4=H$), in which $R^v$ is $CH_2$ and aryl is a 5- or 6-membered aromatic ring having 3 to 6 carbon atoms, as for example an imidazole radical or phenyl radical.

Examples of particularly suitable imidazoles monosubstituted in position 1 are 1-methylimidazole, 1-ethylimidazole 1-propylimidazole, 1-butylimidazole, 1-phenylimidazole, and 1,1-methylenebisimidazole.

Among the imidazoles disubstituted in positions 1 and 2, particular preference is given more particularly to 1,2-dialkylimidazoles, such as 1,2-dimethylimidazole, for example.

As described above, all of the aforementioned radicals $R^1$, $R^2$, $R^3$, and $R^4$ may optionally contain heteroatoms such as, for example, oxygen, sulfur or nitrogen. In aliphatic radicals, oxygen, for example, may be present as an ether oxygen between two carbon atoms, or in the form of an ester group. The concept of the aromatic radicals or aryl radicals herein embraces, in its widest definition, therefore, heteroaromatic radicals or heteroaryl radicals as well, such as imidazole radicals, for example. In the same way, the concept of the aliphatic radical also encompasses heteroaliphatic radicals.

In each of the above-stated definitions for the radicals $R^1$, $R^2$, $R^3$, and $R^4$, the radicals may be substituted or unsubstituted. Where the radicals are substituted, examples of typical substituents include hydroxyl groups, thiol groups, primary and secondary amino groups, ester groups, or halogens such as chlorine or fluorine. One example of an OH-substituted alkyl radical is a hydroxyalkyl radical such as in 1-hydroxyethyl-imidazole. With preference, however, the radicals $R^1$, $R^2$, $R^3$, and $R^4$ are unsubstituted.

The zinc-imidazole-carboxylate complexes (D) are preparable by reacting at least one Zn(II) biscarboxylate with one or more of the imidazoles identified above.

Especially suitable Zn(II) biscarboxylates are those in which the carboxylate radicals are selected from the linear or branched aliphatic, optionally substituted monocarboxylic acids having up to 12 carbon atoms and/or aromatic, optionally substituted monocarboxylic acids having 6 to 12 carbon atoms in the aromatic radical. The carboxylate radical substantially determines the solubility of the resulting complex in the other components of the coating material composition of the invention. With very particular preference, the zinc-imidazole-carboxylate complexes (D) in the coating material compositions of the invention are those in which the carboxylate is a linear or branched aliphatic monocarboxylic acid, more particularly a branched or unbranched alkanoate having 6 to 10 carbon atoms, such as a 2-ethylhexanoate, for example.

The zinc-imidazole-carboxylate complexes (D) may be prepared by reacting at least one Zn(II) biscarboxylate with one or more of the above-identified imidazoles. Up to four mols of an imidazole or a mixture of two or more imidazoles may thus be reacted with one mol of the Zn(II) biscarboxylate.

The reaction of the zinc(II) biscarboxylate or biscarboxylates with the imidazole or with the imidazole mixture takes place typically in a solvent. Solvents employed in this context are more particularly those solvents which allow sufficient solubility of the zinc(II) biscarboxylates and imidazoles and also of the resultant zinc-imidazole-carboxylate complexes (D). They are preferably free from groups that are reactive toward isocyanate groups. Examples of such solvents are the typical solvents for polyisocyanates that are known to the skilled person.

The reaction of the zinc(II) biscarboxylates with the imidazole or with the imidazole mixture may also take place, however, in the polyhydroxyl group-containing component (A) and/or in the low molecular mass alcohols recited as component (C), optionally in a mixture with other solvents inert toward isocyanates.

The reaction of the zinc(II) biscarboxylates with the imidazole or with the imidazole mixture takes place typically at room temperature (20° C.) or elevated temperature of up to 100° C. In this case, in general, the zinc(II) biscarboxylate is introduced in the solvent and/or in components (A) and/or (C), and the imidazole component (optionally dissolved in one of the aforementioned solvents) is added slowly dropwise. After waiting for the exothermic production of heat, stirring is then continued over a period of, for example, 2 hours at an elevated temperature of, for example, 60° C. or more.

In another particular embodiment, it is also possible, especially when the coating materials are two-component coating materials, for the zinc-imidazole-carboxylate complex (D) to be prepared in situ. For this purpose, a corresponding amount of the imidazole or of the imidazole mixture is introduced in the hydroxyl-containing binder (A) and optionally (C), and a corresponding amount of the Zn(II) biscarboxylate in the polyisocyanate-containing component (B). The coating material of the invention is then prepared by mixing of the hydroxyl-containing binder component (A) and also optionally (C), comprising the imidazole, and of the initially separately stored polyisocyanate-containing component (B), which also comprises the Zn(II) biscarboxylate.

It is further essential to the invention that the coating composition comprises at least one monomeric aromatic, unsubstituted or substituted carboxylic acid (S) whose carboxyl group is in conjugation to a pi electron system. The number of carboxyl groups may vary, with the carboxylic acids preferably having one carboxyl group. The monomeric aromatic, unsubstituted or substituted carboxylic acids (S) preferably have a molecular weight <500 g/mol, more preferably <300 g/mol. It is preferred to use monomeric aromatic, unsubstituted or substituted carboxylic acids (S) which have a $pK_a$ of 2 to 5. The $pK_a$ corresponds to the pH at the half-equivalent point, the solution medium preferably being water. If it is not possible to cite a $pK_a$ in water for an acid, then the medium selected is preferably DMSO or else another suitable medium in which the acid is soluble.

Suitable acids are monomeric aromatic monocarboxylic and polycarboxylic acids, the corresponding alkyl- and aryl-substituted aromatic monocarboxylic and polycarboxylic acids, and also the corresponding hydroxyl-containing aromatic monocarboxylic and polycarboxylic acids, such as, for example, phthalic acid and terephthalic acid, alkyl- and/or aryl-substituted phthalic acid and terephthalic acid, benzoic acid and alkyl- and/or aryl-substituted benzoic acid, aromatic carboxylic acids with further functional groups such as salicylic acid and acetylsalicyclic acid, alkyl- and aryl-substituted salicylic acid or isomers thereof, polycyclic aromatic carboxylic acids, such as the isomers of naphthalenecarboxylic acid, and derivatives thereof.

The coating material preferably comprises, as monomeric aromatic carboxylic acid (S), benzoic acid, tert-butylbenzoic acid, 3,4-dihydroxybenzoic acid, salicylic acid and/or acetylsalicylic acid, more preferably benzoic acid.

Where the coating materials are one-component materials, the polyisocyanate group-containing compounds (B) selected are those whose free isocyanate groups are blocked with blocking agents. The isocyanate groups may be blocked, for example, with substituted pyrazoles, in particular with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. With particular preference the isocyanate groups of component (B) are blocked with 3,5-dimethylpyrazole.

The two-component (2-K) coating materials that are particularly preferred in accordance with the invention entail the mixing, shortly before the application of the coating material, of a coating component comprising the polyhydroxyl group-containing compound (A) and also further components, described below, with a further coating component comprising the polyisocyanate group-containing compound (B) and also, if desired, further of the components described below, this mixing taking place in a conventional way; in general, the coating component which comprises the compound (A) comprises the zinc-imidazole-carboxylate complex (D) as defined above and also a portion of any solvent present.

The weight fractions of the polyhydroxyl group-containing component (A) and, where appropriate, (C) and of the polyisocyanate group-containing component (B) are preferably selected such that the molar equivalents ratio of the hydroxyl groups of the polyhydroxyl group-containing compound (A) plus, where appropriate (C) to the isocyanate groups of component (B) is between 1:0.9 and 1:1.5, preferably between 1:0.9 and 1:1.1, more preferably between 1:0.95 and 1:1.05.

It is preferred in accordance with the invention to use coating materials which comprise from 30% to 80%, preferably from 50% to 70%, by weight, based in each case on the binder content of the coating material, of at least one polyhydroxyl group-containing component (A), preferably at least one polyhydroxyl group-containing polyacrylate (A) and/or at least one polyhydroxyl group-containing polymethacrylate (A).

It is likewise preferred in accordance with the invention to use coating materials which comprise from 5% to 50%, preferably from 25% to 40%, by weight, based in each case on the binder content of the coating material, of the polyisocyanate group-containing component (B).

The coating materials of the invention preferably comprise the zinc-imidazole-carboxylate complex (D) as defined above in an amount such that the zinc content of the complex, based in each case on the binder content of the coating material, is between 35 and 2000 ppm, preferably between 35 and 1000 ppm, and more preferably between 100 and 1000 ppm.

The coating materials of the invention preferably further comprise 0.2% to 15.0%, preferably 0.5% to 8.0%, and more preferably 0.5% to 5.0%, by weight, of at least one monomeric aromatic carboxylic acid (S), the percentages by weight being based in each case on the binder content of the coating material.

With particular preference the coating material composition is a 2-component system wherein the at least one polyisocyanate group-containing component (B) is stored separately from the at least one polyhydroxyl group-containing component (A) and the components are mixed with one another not until shortly before processing.

In the case of a 2-component system, both the zinc-imidazole-carboxylate complex (D) as defined above and the monomeric aromatic carboxylic acid (S) may be included in both components, but preferably only one component comprises the stated substances, and preferably both monomeric aromatic carboxylic acid (S) and the zinc-imidazole-carboxylate complex (D) are in solution in the polyol component.

Furthermore, the imidazole of the general formula (I) may also be in solution in the polyol component, and the zinc bis(carboxylate) component in the polyisocyanate component. In that case, the active zinc-imidazole-carboxylate complex (D) is formed in situ only after the mixing of the polyisocyanate component and the polyol component.

The coating materials are preferably nonaqueous coating materials. The coating materials may comprise solvents or be formulated as solvent-free systems. Examples of suitable solvents are the solvents already recited for the polyhydroxyl group-containing component (A) and, where appropriate, (C) and for the polyisocyanate group-containing compound (B). The solvent or solvents are used in the coating materials of the invention preferably in an amount such that the solids content of the coating material is at least 50%, more preferably at least 60%, by weight.

The coating materials of the invention may additionally comprise 0% to 30%, preferably 0% to 15%, by weight, based in each case on the binder content of the coating material, of one or more amino resins and/or one or more tris(alkoxycarbonyl-amino)triazines (E).

Examples of suitable tris(alkoxycarbonylamino)triazines are given in U.S. Pat. No. 4,939,213, in U.S. Pat. No. 5,084,541, and in EP-A-0 624 577.

Examples of suitable amino resins (E) are all of the amino resins typically used in the coating industry sector, the properties of the resultant coating compositions being controllable via the reactivity of the amino resin. The resins are condensation products of aldehydes, more preferably formaldehyde, and, for example, urea, melamine, guanamine, and benzoguanamine. The amino resins comprise alcohol groups, preferably methylol groups, generally some of which, or preferably all of which, are etherified with alcohols. Use is made in particular of amino resins etherified with lower alcohols. Preference is given to using amino resins etherified with methanol and/or ethanol and/or butanol, examples being the products available commercially under the names Cymel®, Resimene®, Maprenal® and Luwipal®.

The amino resins (E) are long-established compounds and are described in detail in, for example, the American patent application US 2005/0182189 A1, page 1, paragraph [0014], to page 4, paragraph [0028].

The binder mixture of the invention and/or the coating material of the invention may further comprise at least one customary and known coatings additive (F) in effective amounts, i.e., in amounts preferably up to 30%, more preferably up to 25%, and more particularly up to 20%, by weight, based in each case on the binder content of the coating material.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
reactive diluents different from components (A) and (C), more particularly reactive diluents which become reactive only through reaction with further constituents and/or with water, such as Incozol or aspartic esters, for example;
wetting agents different from components (A) and (C), such as siloxanes, fluorine-containing compounds, carboxylic monoesters, phosphoric esters, polyacrylic acids and their copolymers, or polyurethanes;
adhesion promoters;
flow control agents;
film-forming assistants such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheology control additives different from components (A) and (C), such as the additives known from patents WO 94/22968, EP-A-0 276 501, EP-A-0 249 201 or WO 97/12945; crosslinked polymeric microparticles, of the kind disclosed in EP-A-0 008 127, for example; inorganic phyllosilicates such as aluminum magnesium silicates, sodium magnesium and sodium magnesium fluorine lithium phyllosilicates of the montmorillonite type; silicas such as Aerosils®; or synthetic polymers having ionic and/or associative groups, such as poly(meth)acylamide, poly(meth)acrylic acid, polyvinylpyrrolidone, styrene-maleic anhydride or ethylene maleic anhydride copolymers and their derivatives, or hydrophobically modified ethoxylated urethanes or polyacrylates;
flame retardants.

Particularly preferred are coating materials which comprise 50% to 70% by weight, based on the binder content of the coating material, of at least one polyhydroxyl group-containing polyacrylate (A) and/or at least one polyhydroxyl group-containing polymethacrylate (A), 25% to 40% by weight, based on the binder content of the coating material, of the polyisocyanate group-containing compound (B), 0% to 10% by weight, based on the binder content of the coating material, of the hydroxyl group-containing component (C), 0.5% to 5.0% by weight, based on the binder content of the coating material, of at least one monomeric aromatic carboxylic acid (S), 0% to 15% by weight, based on the binder content of the coating material, of one or more amino resins and/or one or more tris(alkoxycarbonylamino)triazines (E), and 0% to 20% by weight, based on the binder content of the coating material, of at least one customary and known coatings additive (F) and comprise at least one zinc-imidazole-carboxylate complex (D) as defined above in an amount such that the zinc content of the zinc-imidazole-carboxylate complex (D), based in each case on the binder content of the coating material, is between 100 and 1000 ppm.

In a further embodiment of the invention, the binder mixture or coating material of the invention may further comprise other pigments and/or fillers and may serve for producing pigmented topcoats and/or pigmented undercoats or primer-surfacers, more particularly pigmented topcoats. The pigments and/or fillers that are used for these purposes are known to the skilled person. The pigments are typically used in an amount such that the pigment-to-binder ratio is between 0.05:1 and 1.5:1, based in each case on the binder content of the coating material.

The invention further provides the inventive use of a catalyst system comprising at least one zinc-imidazole-carboxylate complex (D) as defined above and at least one monomeric aromatic carboxylic acid (S) in which the carboxyl group is in conjugation to a pi electron system for the catalysis of the urethane reaction in coating material compositions which comprise at least one polyisocyanate group-containing component and at least one polyhydroxyl group-containing component. The catalyst system is notable for the combined use of the at least one zinc-imidazole-carboxylate complex (D) as defined above and the at least one monomeric aromatic carboxylic acid (S) in which the carboxyl group is in conjugation to a pi electron system. The catalysis reaction is carried out preferably at 20 to 60° C. The coating material compositions preferably comprise the above-described at least one polyhydroxyl group-containing component (A) and the at least one polyisocyanate group-containing component (B).

The coating materials of the invention may be applied by all of the customary application methods, such as spraying, knifecoating, spreading, pouring, dipping, impregnating, trickling or rolling, for example. In the course of such application, the substrate to be coated may itself be at rest, with the application equipment or system being moved. Alternatively, the substrate to be coated, more particularly a coil, may be moved, with the application system being at rest relative to the substrate or being moved appropriately.

Preference is given to employing spray application methods, such as, for example, compressed-air spraying, airless spraying, high-speed rotation, electrostatic spray application (ESTA), alone or in conjunction with hot spray application such as, for example, hot-air spraying.

Since the coatings of the invention produced from the coating materials of the invention also adhere outstandingly to already-cured electrocoat finishes, surfacer finishes, basecoat finishes or customary and known clearcoat finishes, they are outstanding suitable not only for use in automotive OEM (production-line) finishing but also for automotive refinish and/or for the coating of parts for installation in or on automobiles and/or for the coating of utility vehicles.

The applied coating materials of the invention can be cured after a certain rest time. The rest time serves, for example, for the flow and devolatization of the coating films or for the evaporation of volatile constituents such as solvents. The rest time may be assisted and/or shortened by use of elevated temperatures and/or by a reduced atmospheric humidity, provided that this does not entail any damage to or change in the coating films, such as premature complete crosslinking, for instance.

There are no peculiarities of method as far as the thermal curing of the coating materials is concerned; this curing instead takes place in accordance with the customary and known methods such as heating in a forced-air oven or irradiation with IR lamps. Thermal curing here may also take place in stages. Another preferred method of curing is that using near infrared (NIR) radiation.

Thermal curing takes place advantageously at a temperature of 20 to 200° C. for a time of 1 minute up to 10 hours, although longer cure times may also be employed at low temperatures. For automotive refinish and for the painting of plastics parts, and also for the finishing of utility vehicles, it is usual to employ relatively low temperatures, which are preferably between 20 and 80° C., more preferably between 20 and 60° C.

The coating materials of the invention are suitable for any kind of coatings, such as for electrocoats, coil coatings, wire enamels, and automobile finishes, as pulverant, solvent borne, solvent-free, and aqueous coating materials. The coating materials are used preferably as a high-grade coating on articles of any kind where, for reasons either of a technical nature or of economics, it is not possible to dry the coatings at high temperatures. These systems are employed in primer coats and also in topcoat systems. These topcoat systems may be pigmented or else may be employed as unpigmented systems (=clearcoats). With particular preference the coating material compositions of the invention are used in automotive refinish, preferably as automobile topcoat finishes (solid+ CC).

The coating materials of the invention are outstandingly suitable for use as decorative, protective and/or effect coatings and finishes on bodywork of means of transport (more particularly motor vehicles, such as motorcycles, buses, trucks or automobiles) or of parts thereof; of the interior and exterior of edifices; of furniture, windows, and doors; of plastics moldings, more particularly compact discs and windows; of small industrial parts, of coils, containers, and packaging; of white goods; of films; of optical, electrical, and mechanical components; and also of hollow glassware and articles of everyday use.

Consequently, the coating materials of the invention can be applied, for example, to an uncoated or precoated substrate, the coating materials of the invention being either pigmented or unpigmented. The coating materials and finishes of the invention, more particularly the clearcoat finishes, are employed more particularly in the technologically and esthetically particularly demanding field of automotive OEM finishing and for the coating of plastics parts for installation in or on automobile bodies, more particularly for top-class automobile bodies, such as, for example, for producing roofs, tailgates, engine cowlings, fenders, bumpers, spoilers, sills, protective strips, side trim, and so on, and also for automotive refinish and for the finishing of utility vehicles, such as, for example, of trucks, chain-driven construction vehicles, such as crane vehicles, wheel loaders, and concrete mixers, buses, rail vehicles, watercraft, aircraft, and also agricultural equipment such as tractors and combines, and parts thereof.

The plastics parts are typically composed of ASA (acrylonitrile-styrene-acrylate), polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene-acrylonitrile polymers wherein graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference the coating materials of the invention are used in multistage coating methods, more particularly in methods which involve applying, to an uncoated or precoated substrate, first a pigmented basecoat film and thereafter a coat with the coating material of the invention. The invention accordingly also provides multicoat effect and/or color coating systems comprising at least one pigmented basecoat film and, disposed thereon, at least one clearcoat film, such systems preferably featuring a clearcoat film produced form the coating material of the invention.

Not only water-thinnable basecoats but also basecoats based on organic solvents may be used. Suitable basecoats are described in, for example, EP-A-0 692 007 and the documents cited therein at column 3, lines 50 et seq. Preferably, the applied basecoat is first dried, which means that, in an evaporation phase, at least some of the organic solvent and/or the water is removed from the basecoat film. Drying takes place preferably at temperatures from room temperature to 80° C. After drying has taken place, the coating material of the invention is applied. The two-coat finish is then preferably baked, under conditions employed in automotive OEM finishing, at temperatures from 20 to 200° C. for a time from 1 minute up to 10 hours, although longer cure times may be employed in the case of the temperatures employed for automotive refinish, which are generally between 20 and 80° C., more particularly between 20 and 60° C.

In another preferred embodiment of the invention, the coating material of the invention is used as a transparent clearcoat for the coating of plastics substrates, more particularly of plastics parts for installation in or on other articles. These plastics parts are preferably likewise coated in a multistage coating method, which involves applying, to an uncoated or precoated substrate or to a substrate which has been pretreated for improved adhesion of the subsequent coatings (for example, by flaming, corona treatment or plasma treatment of the substrate), first a pigmented basecoat film and thereafter a coat with the coating material of the invention.

The invention further relates to coatings produced from the coating material compositions of the invention or produced using in combination a catalyst system comprising at least one zinc-imidazole-carboxylate complex (D) as defined above and at least one aromatic carboxylic acid (S) in which the carboxyl group is in conjugation to a pi electron system. These coatings find application preferably in the automobile sector. The coatings may also serve for producing multicoat paint systems. Consequently, the invention further describes multicoat systems which comprise at least one coating of the invention. The multicoat systems are preferably automobile finishes.

The present invention is illustrated by reference to the examples which follow.

EXAMPLES

Gel Permeation Chromatography (GPC)

The gel permeation chromatography was carried out at 40° C. using a high-pressure liquid chromatography pump and a refractive-index detector. The eluent used was tetrahydrofuran, with an elution rate of 1 ml/min. the calibration was carried out by means of polystyrene standards. The number-average molecular weight Mn, the weight-average molecular weight Mw, and Mp were ascertained, the polydispersity index Mp being calculated from Mp=Mw/Mn.

Hydroxyl Number/Acid Number:

The hydroxyl number is calculated via the fraction of OH-functional components used and expressed in mg of KOH per gram of resin solids. The hydroxyl number (OH number) indicates the number of mg of potassium hydroxide equivalent to the amount of acetic acid bound by 1 g of substance on acetylation.

The acid number here indicates the number of mg of potassium hydroxide consumed in neutralizing 1 g of the respective compound (DIN EN ISO 2114).

Solids Determination

Approximately 1 g of sample are weighed out into a tin plate lid. Following addition of around 3 ml of butyl acetate, the sample is dried in a drying cabinet at 130° C. for 60 minutes, cooled in a desiccator, and then weighed again. The residue corresponds to the solids fraction.

Binder Content Determination

The binder fraction means in each case that fraction of the coating composition that is soluble in tetrahydrofuran (THF), prior to crosslinking. For its determination, a small sample (P) is weighed out, dissolved in 50 to 100 times the amount of THF, insoluble constituents are removed by filtration, the THF is evaporated off, and then the solids of the constituents previously dissolved in THF is ascertained by drying at 130° C. for 60 minutes, cooling in a desiccator, and then repeat weighing. The residue corresponds to the binder content of the sample (P).

Freedom from Tack by the Zapon Tack Test (ZTT):

An aluminum strip with a thickness of 0.5 mm, a width of 2.5 cm, and a length of 11 cm is bent at an angle of 110° to give a surface measuring 2.5×2.5 cm. The long side of the metal plate is bent, after a further 2.5 cm, by about 15°, so that the plate is just held in balance by a weight (5 g) placed in the center of the square area. For the measurement of the ZTT tack-free state, the bent plate is placed on the coating film and weighed down with a 100 g weight for 30 seconds. Following removal of the weight, the coating is considered tack-free if the metal angle falls over within 5 s. The test is repeated at intervals of 15 minutes. Before the test is deployed, the tackiness of the coating film is assessed qualitatively by touch. In the case of tests at elevated temperature, the test panels are stored at room temperature for 10 minutes for cooling before the test is commenced.

Print Test:

The coating film is drawn down using a 100 micrometer applicator onto a glass plate. After drying at 60° C. for 30 minutes, the glass plate, within a period of 10 minutes following removal from the oven, is placed on a commercial laboratory balance. Using thumb pressure, the film is then loaded with a weight of 2 kg for 20 seconds. This test is repeated every 10 minutes. In the case of a coating film which is obviously still soft or tacky, the coating film is first left until it has reached a sufficient freedom from tack, and a sufficient hardness. The tests are evaluated after a storage time of 24 hours. For the evaluation, the surface of the coating is washed off with aqueous surfactant solution (commercial washing-up detergent) and a soft cloth, in order to remove grease marks. The coating is considered satisfactory if there is no visible thumb imprint on the coating film. This test is a measure of the assembly strength of refinishes—the earlier that the coating film has attained its assembly strength after forced drying, the earlier that assembly operations (or disassembly operations to remove adhesive masking) may be commenced on the refinished bodywork.

Drying Recorder:

The coating is drawn down using a 100 micrometer applicator onto glass plates with dimensions of 280 mm×25 mm. With the aid of the Byk Dry-time Recorder, needles are drawn over the film at a defined speed. Assessments are made of three different phases and also of the total length (i.e., sum of phase 1+phase 2+phase 3) of the track.

Phase 1: the needle track closes up again

Phase 2: the needle track results in a deep furrow in the coating film

Phase 3: the needle causes only superficial damage to the film

The assessment is always undertaken against a standard.

Mill Base:

86.4 g of a styrene-containing polyacrylate (62% in solvent naphtha/ethoxyethyl propionate/methyl isobutyl ketone (20/46/34)) having a molecular weight of 1600-2200 (Mn) and 4000-5000 (Mw), a measured acid number of 12-16 mg KOH/g, a calculated OH number (OHN) of about 130 mg KOH/g (resin solids), and a viscosity of the 60% strength solution in butyl acetate of 200-400 mPa·s, measured using a rotary viscometer (Brookfield CAP 2000, spindle 3, 1000 rpm) are stirred together with 6.4 g of methyl isobutyl ketone, 2.2 g of a commercial light stabilizer mixture composed of UV and HALS light stabilizers and also with 0.15 g of a commercial flow control agent based on a polyacrylate, to form a homogeneous mixture. In this mixture, in accordance with the figures in table 1, first of all the indicated amount of the respective imidazole derivative is dissolved, and then the indicated amount of zinc (2-ethylhexanoate)$_2$ is added. The millbase mixture is left to stand at room temperature for 24 hours.

Curing Agent Solution:

In a mixture of 5.17 parts of xylene, 10.3 parts of butyl acetate, 1.51 parts of ethyl ethoxypropionate, 8.03 parts of methyl isobutyl ketone, and 0.310 part of a commercial flow control agent based on a polyacrylate (55% in solvent Naphtha®), 28.12 g of trimerized hexamethylene diisocyanate (HDI) containing isocyanurate groups and having an isocyanate content of 22.0%, based on the solvent-free trimerized hexamethylene diisocyanate, are dissolved.

Experimental Procedure:

Additional components such as benzoic acid and catalyst solutions are dissolved in the millbase. Following gentle stirring, clear solutions are obtained. For the implementation of the experiments, the millbase is introduced and the curing agent is added. The solution is homogenized by stirring. For the viscosity measurements, adjustment to the specified viscosity is made by addition of solvent. For the glass drawdowns, the viscosity adjustment is not made. For the drying test, the coating film is drawn down using a 100 micrometer four-way bar applicator onto glass plates to produce a film thickness of 30-35 micrometers. For the testing of the pendulum hardness, the film is poured onto glass plates, and before the Koenig film hardness is ascertained, the thickness of the applied film at the score mark (DIN 50933) is measured. For the tests using a drying recorder, the samples are likewise drawn down using a 100 micrometer four-way bar applicator onto suitable glass strips with length of approximately 280 mm and a width of approximately 25 mm; the film thicknesses achieved thereby are 30-35 micrometers.

Table 1 shows the properties of the inventive examples in comparison to a standard formulation of a 2K polyurethane clearcoat catalyzed with DBTL.

TABLE 1

| Example | C0 | I1 | I2 | I3 | I4 | I5 |
|---|---|---|---|---|---|---|
| Millbase | 95.15 | 95.15 | 95.15 | 95.15 | 95.15 | 95.15 |
| Dibutyltin dilaurate | 0.06 | | | | | |
| Benzoic acid | 1.5 | 1.5 | 1.5 | 1.5 | 1.5 | 1.5 |
| 1,1-Methylenebisimidazole | | 0.055 | | | | |
| 1-Benzylimidazole | | | 0.153 | | | |
| 1-Butylimidazole | | | | 0.113 | | |
| 1-Hydroxyethylimidazole | | | | | 0.096 | |
| 1,2-Dimethylimidazole | | | | | | 0.077 |
| Zinc (2-ethylhexanoate)$_2$ | | 0.13 | 0.17 | 0.16 | 0.15 | 0.14 |
| Curing agent solution | 53.38 | 53.38 | 53.38 | 53.38 | 53.38 | 53.38 |
| Metal content [ppm] | 72 | 161 | 210 | 198 | 186 | 175 |
| Potlife DIN 4 [s] | | | | | | |
| directly | 25 | 24 | 23 | 23 | 23 | 21 |
| after 1 h | 30 | 35 | 34 | 27 | 28 | 28 |
| after 2 h | 38 | 61 | 54 | 33 | 37 | 43 |
| after 3 h | 64 | | | 42 | 53 | |
| ZAPON tack | | | | | | |
| 30'60° C./10'RT [min] | 0 | 0 | 0 | 15 | 0 | 0 |
| RT [min] | 160 | 330 | 210 | 210 | 330 | 210 |
| König pendulum damping in swings | | | | | | |
| 23° C. RT after 1 d | 102 | 67 | 61 | 111 | 111 | 64 |
| 23° C. RT after 7 d | 131 | 91 | 74 | 137 | 141 | 83 |
| 30'60° C. after 1 d | 83 | 137 | 146 | 78 | 139 | 146 |
| 30'60° C. after 7 d | 95 | 141 | 155 | 88 | 154 | 153 |
| Print test - 15 min 60° C./10 min RT [min][5] | 100 | 320 | 120 | 120 | 320 | 140 |

Experiments I1-I5 were repeated except that this time no benzoic acid was added.

Table 2 shows the values achieved for the tack-free times after the print test[5)].

TABLE 2

| | Example | | | | |
|---|---|---|---|---|---|
| | C1 | C2 | C3 | C4 | C5 |
| Print-Test - 15 min 60° C. 10 min RT [min] | >360 | >360 | 320 | >360 | >360 |

Discussion: In the experiments it is apparent that, through combination of the zinc-imidazole-carboxylate complexes of the invention with the benzoic acid, assembly strength can be achieved significantly earlier than without benzoic acid.

The invention claimed is:

1. A coating material composition comprising:
   at least one polyhydroxyl group-containing component (A);
   at least one polyisocyanate group-containing component (B);
   at least one zinc-imidazole-carboxylate complex (D) comprising the reaction product of at least one Zn(II) biscarboxylate with one or more imidazoles of general formula (I)

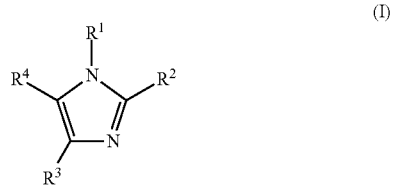

wherein
   $R^1$ is an acyclic or cyclic, saturated or unsaturated hydrocarbon radical, an aromatic hydrocarbon radical or a radical $R^v$-aryl, wherein $R^v$ is an alkylene radical and aryl is an aromatic radical, and wherein all of the aforementioned radicals may contain heteroatoms,
   $R^2$, $R^3$ and $R^4$ independently of one another are hydrogen, an acyclic or cyclic, saturated or unsaturated hydrocarbon radical, an aromatic hydrocarbon radical or a radical $R^v$-aryl, wherein $R^v$ is an alkylene radical and aryl is an aromatic radical, and wherein all of the aforementioned radicals may contain heteroatoms,
   with the proviso that
   zinc-(1-methylimidazole)-bis(2-ethylhexanoate) complexes (D) comprising the reaction product of zinc(II) bis(2-ethylhexanoate) with 1-methylimidazole in a molar ratio of 1 to ≤2.2 are excluded; and
   at least one monomeric aromatic carboxylic acid (S) having a carboxyl group in conjugation to a pi electron system.

2. The coating material composition of claim 1, wherein the at least one polyhydroxyl group-containing component (A) is selected from the group consisting of a poly(meth)acrylate polyol, a polyester resin, and mixtures of two or more of the foregoing.

3. The coating material composition of claim 1, wherein the polyisocyanate group-containing component (B) is selected from the group consisting of 1,6-hexamethylene diisocyanate, isophorone diisocyanate, 4,4'-methylenedicyclohexyl diisocyanate, a biuret dimer of one or more of the foregoing, an isocyanurate trimer of one or more of the foregoing, an asymmetric trimer of one or more of the foregoing, and mixtures of two or more of the foregoing.

4. The coating material composition of claim 1, wherein the at least one monomeric aromatic carboxylic acid (S) is selected from the group consisting of benzoic acid, tert-butylbenzoic acid, 3,4-dihydroxybenzoic acid, salicylic acid, acetylsalicylic acid, and mixtures of two or more of the foregoing.

5. The coating material composition of claim 1, comprising the at least one zinc-imidazole-carboxylate complex (D) in an amount such that the metal content of the zinc-imidazole-carboxylate complex (D), based in each case on the binder fraction of the coating material, is between 35 and 2000 ppm, and/or the coating material comprises 0.2% to 15.0%, by weight of at least one monomeric aromatic carboxylic acid (S), the percentages by weight based on the binder fraction of the coating material.

6. The coating material composition of claim 1, further comprising one or more hydroxyl-containing compounds (C) different from component (A) and/or in that the molar equivalent ratio of the hydroxyl groups of the hydroxyl-containing compound (A) plus where appropriate (C) to the isocyanate groups of component (B) is between 1:0.9 and 1:1.5.

7. The coating material composition of claim 1, wherein the coating material is nonaqueous, and/or further comprising pigments.

8. A coating comprising at least one coat of the coating material composition of claim 1, wherein the coating is adhered to a substrate selected from automotive substrates.

9. A method of coating a substrate, comprising applying the coating material composition of claim 1 to the substrate, and forming a coat, wherein the substrate is selected from the group consisting of automotive and/or utility vehicle substrates.

10. The method of claim 9 wherein the coating material composition is an automotive refinish coating and is either pigmented or unpigmented and the substrate is selected from the group consisting of parts for installation in or on automobiles, plastics substrates, substrates for utility vehicles, and mixtures of two or more of the foregoing.

11. A multistage coating method comprising applying a pigmented basecoat film to an uncoated or precoated substrate, and thereafter applying the coating material composition of claim 1 to form a coat, wherein the coating material composition may be pigmented or unpigmented.

12. The multistage coating method of claim 11, further comprising, following application of the pigmented basecoat film, the applied basecoat is first dried at temperatures from room temperature to 80° C. and, following the application of the coating material composition, is cured at temperatures between 20 and 80° C.

13. The multistage coating method of claim 11 wherein the coating material composition is an automotive refinish coating and is either pigmented or unpigmented, and the substrate is selected from the group consisting of parts for installation in or on automobiles, plastics substrates, substrates for utility vehicles, and mixtures of two or more of the foregoing.

14. A method of catalyzing a urethane reaction in a coating material composition comprising at least one polyisocyanate group-containing component and at least one polyhydroxyl group-containing component, the method comprising adding to the coating material composition a catalyst system comprising at least one zinc-imidazolecarboxylate complex (D) and at least one monomeric aromatic carboxylic acid (S) wherein the carboxyl group is in conjugation to a pi electron system, wherein the zinc-imidazole-carboxylate complex (D) comprises the reaction product of at least one Zn(II) biscarboxylate with one or more imidazoles of the general formula (I)

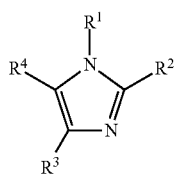

(I)

wherein

R$^1$ is an acyclic or cyclic, saturated or unsaturated hydrocarbon radical, an aromatic hydrocarbon radical or radical R$^v$-aryl, wherein R$^v$ is an alkylene radical and aryl is an aromatic radical, and wherein all of the aforementioned radicals may contain heteroatoms, R$^2$, R$^3$ and R$^4$ independently of one another are hydrogen, an acyclic or cyclic, saturated or unsaturated hydrocarbon radical, an aromatic hydrocarbon radical or a radical R$^v$-aryl, wherein R$^v$ is an alkylene radical and aryl is an aromatic radical, and wherein all of the aforementioned radicals may contain heteroatoms, with the proviso that zinc-(1-methylimidazole)-bis(2-ethylhexanoate) complexes (D) comprising the reaction product of zinc(II) bis(2-ethylhexanoate) with 1-methylimidazole in a molar ratio of 1 to ≤2.2 are excluded.

15. The method of claim 14 wherein the coating material composition comprises at least one polyhydroxyl group-containing component (A) and at least one polyisocyanate group-containing component (B) and/or the catalysis is carried out at 20 to 60° C.

* * * * *